Patented Oct. 7, 1947

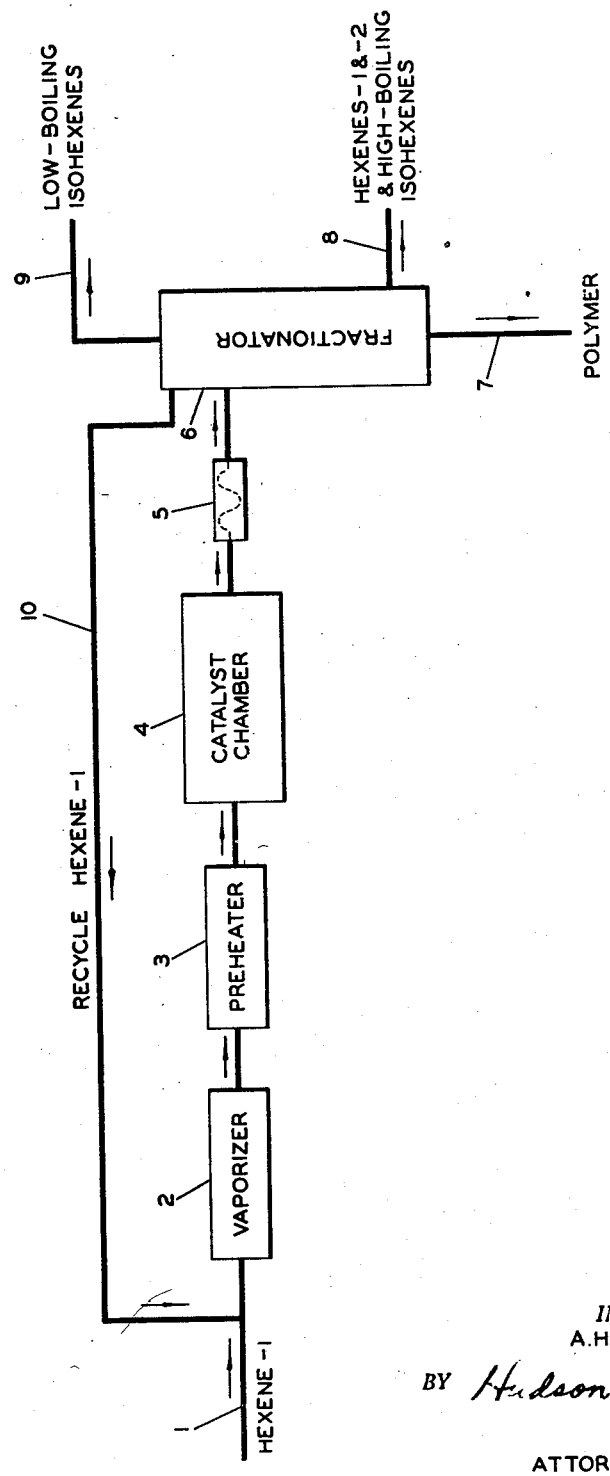

2,428,455

UNITED STATES PATENT OFFICE 2,428,455

ISOMERIZATION OF OLEFINS

Alvin H. Friedman, Bartlesville, Okla., assignor to Phillips Petroleum Company, a corporation of Delaware Application December 26, 1945, Serial No. 637,168

8 Claims. (Cl. 260—683.2)

This invention relates to catalytic isomerization of olefins. In one particular aspect it relates to a novel catalyst useful in such isomerizations. In another particular aspect it relates to improved processes for isomerizing olefins having a terminal ethylenic linkage to corresponding olefins having the unsaturated carbon atoms further from the end of the carbon chain. The catalyst and process of this invention are particularly effective in isomerizing hexene-1 to a mixture of hexene-2, hexene-3 and branched chain hexenes, but are not limited to this reaction.

In the rapid development of hydrocarbon technology, isomerization of olefins has become a very important type of reaction. It is well known that 1-olefins (alpha olefins) may be made to undergo isomerization whereby the unsaturated linkage migrates toward the center of the carbon chain. In the presence of catalysts a second equilibrium is also established between isoolefins and normal olefins. The over-all equilibrium may be represented as follows, using butenes as an example:

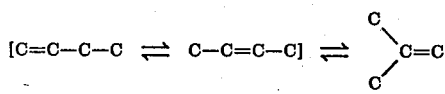

The 1-olefins and 2- or 3-olefins are identical in many chemical properties but differ widely in certain physical characteristics. As an example of such difference we may note the boiling points, the 1-olefins being lower boiling than the 2-olefins or the corresponding paraffins. Alkylation products formed by alkylation of 2-olefins with low-boiling isoparaffins have higher octane numbers than those obtained from corresponding 1-olefins. Hydrogenation of branched chain olefins of suitable molecular weight also yields branched chain paraffins of high anti-knock value.

The reaction which converts 1-olefins having not less than 4 carbon atoms into olefins in which the double bond is more centrally located in the carbon chain is known to be of the time-equilibrium type. That is, a 1-olefin is gradually converted into an olefin having a more centrally located double bond or vice versa until concentrations of the components reach equilibrium values.

Equilibrium values vary considerably with the temperature of the system. For example a mixture of butene-1 and butene-2 at equilibrium contains 3 per cent butene-1 at 80° F. and 39 per cent butene-1 at 1,340° F. In general it may be said that equilibrium mixtures contain larger proportions of 1-olefins at high temperatures than at low temperatures.

In commercial processes it is not usual for the reaction to go to complete equilibrium. The extent of conversion of 1-olefins to their isomers depends on the reaction velocity and on the time allowed for reaction. It is usual practice to promote reaction velocity in order to decrease the reaction time required for the production of practical yields.

Equilibrium is more rapidly attained at high temperatures but isomerization by thermal methods is usually unsatisfactory because of the slow rate of reaction. At low temperatures the reaction is so extremely slow that appreciable isomerization is not attained and at high temperatures the rate of reaction, although much greater than at low temperatures, is still quite low, equilibrium is shifted toward greater proportions of 1-olefins while yield-reducing side reactions and thermal decompositions occur.

Catalysts are used to control the rate of isomerization and thus to obtain extension conversion of 1-olefins to 2-olefins at relatively low temperatures. Among the catalysts previously used for this conversion may be mentioned sulphuric acid and other strong mineral acids, difficulty reducible metal oxides, neutral salts of boric acid, phosphoric acid, silicic acid and the like.

The principal difficulty that has been encountered in the development of catalysts for this type reaction has arisen from the fact that the less active catalysts frequently require too high tempertures which result in low yield of 2-olefins, while the more active catalysts also frequently promote polymerization reactions which result in excessive losses of olefins and other reactive components of hydrocarbon mixtures undergoing isomerization.

It is an object of this invention to provide an improved process for catalytic isomerization of olefins.

Another object is to cause shifting of a double bond in an unsaturated hydrocarbon by the use of titanium tetrafluoride as a catalyst.

Still another object is to provide an improved method of isomerizing olefins which is effective for isomerization of hexene-1.

Another object is to provide an improved method for the production and recovery of low-boiling branched chain hexenes.

Other objects and advantages will become apparent to those skilled in the art as this disclosure proceeds.

I have found that titanium tetrafluoride is an excellent catalyst for the isomerization of olefins generally, and is very effective in isomerizing hexene-1. In the particular application to isomerization of hexene-1 this olefin is converted to hexene-2, hexene-3 and branched chain hexenes. High yields are quickly obtained. An especial advantage attained by the use of this catalyst with hexene-1 is the high yield of branched chain hexenes obtaintd.

The titanium tetrafluoride catalyst may either be used alone in granular form or may be supported on any suitable support. The olefin feed may be treated in either the liquid or vapor phase. The optimum temperature will depend to some extent upon the particular olefin to be isomerized and may readily be determined by trial in any particular case. In general, a temperature range of 100 to 500° F. is suitable; for the isomerization of hexene-1, a temperature range of 200 to 350° F. is preferred. Pressure is not critical. Very high pressures tend to favor the production of branched chain isomers but substantial yields of these isomers are obtained at atmospheric pressure and the process may be conducted conveniently and economically without the necessity for high pressure equipment. The preferred range of space velocity is from 1 to 10 volumes of liquid olefin per volume of catalyst per hour; or olefin vapor in equivalent quantity.

The invention is not limited to the isomerization of hexene-1 but is generally applicable to isomerization of olefins having more than 3 carbon atoms, particularly those having double bonds attached to terminal carbon atoms. The olefin to be isomerized may be substantially pure or may be in a mixture of other hydrocarbons.

The accompanying drawing is a flow diagram illustrating schematically one particular application of this invention.

Liquid hexene-1 enters the system via line 1 and is substantially completely vaporized in the vaporizer 2. The resulting vapor is preheated to about 300° F. in the preheater 3. The vapor is then passed at atmospheric pressure and at a space velocity of from 1 to 10 liquid volumes per volume of catalyst per hour through the catalyst chamber 4. This chamber is packed with granular titanium tetrafluoride. The effluent from the catalyst chamber passes through the condenser 5 and is introduced into a fractionator 6. This fractionator is operated to separate a relatively low-boiling overhead fraction comprising branched chain hexenes lower boiling than hexene-1, a minor intermediate fraction comprising unisomerized hexene-1 which is recycled to the vaporizer, an intermediate fraction comprising hexene-2, hexene-3 and branched chain hexenes higher boiling than hexene-1, and a kettle product comprising by-product polymers. Further separation of the isomers contained in these fractions may be conducted by methods known to the art if desired.

An alternative method of operation in which the total effluent from the catalyst chamber is passed directly to an alkylation process may be used if desired.

*Example*

Hexene-1 was passed through an electrically heated glass tube containing titanium tetrafluoride. The reaction conditions were: temperature 200 to 330° F.; pressure, atmospheric; space velocity, equivalent to one volume of liquid hexene-1 per volume of catalyst per hour. The effluent was condensed at 32° F. The recovery was 90 per cent, based on the hexene-1 charged. Fractionation of the effluent at atmospheric pressure gave the following results:

| Fraction | Boiling Range, °F. | Vol. per cent of Effluent | Components |
|---|---|---|---|
| 1 | 131.9–146.3 | 20 | Low-boiling isohexenes. |
| 2 | 146.3–174.2 | 53 | Hexene-2, hexene-3, high-boiling isohexenes, and a small amount of hexene-1. |
| 3 | >188 | 27 | Polymers. |

I claim:
1. A process for the production of low-boiling isohexenes which comprises passing vapors of hexene-1 over a solid contact catalyst containing titanium tetrafluoride at a rate equivalent to from 1 to 10 volumes of liquid hexene-1 per volume of catalyst per hour, maintaining the temperature of the catalyst and reactant vapors at a temperature between 200 and 350° F., withdrawing and condensing the resulting products, introducing the condensate so obtained into a medial portion of a fractionation column, fractionally distilling the condensate and withdrawing low-boiling isohexenes as an overhead product.

2. The process of claim 1, conducted at substantially atmospheric pressure.

3. A process for converting hexene-1 into a mixture of hexenes which comprises passing vapors of hexene-1 over a solid contact catalyst containing titanium tetrafluoride at a temperature between 200 and 350° F., and at a rate equivalent to from 1 to 10 volumes of liquid hexene-1 per volume of catalyst per hour.

4. The process of claim 3, conducted at substantially atmospheric pressure.

5. A process for shifting the carbon to carbon double bond in a 1-olefin having at least four carbon atoms in a chain which comprises passing the olefin over a solid contact catalyst comprising titanium tetrafluoride at a temperature between 100 and 500° F. and at substantially atmospheric pressure.

6. A process for shifting the carbon to carbon double bond, in a 1-olefin having at least four carbon atoms in a chain, to a more central position in said carbon chain which comprises passing said 1-olefin in vapor phase over a solid contact catalyst comprising titanium tetrafluoride at a temperature in the range from 100° F. to 500° F. and at substantially atmospheric pressure.

7. A process for shifting the carbon to carbon double bond in a 1-olefin having at least four carbon atoms per molecule which comprises passing the olefin over a solid contact catalyst comprising titanium tetrafluoride at a temperature in the range from 100° F. to 500° F. under substantially atmospheric pressure and at a rate of flow equivalent to from 1 to 10 volumes of liquid 1-olefin per volume of catalyst per hour.

8. A process for shifting the carbon to carbon double bond in a 1-olefin having at least four carbon atoms per molecule to a more central position in the molecule which comprises passing said 1-olefin over a solid contact catalyst comprising titanium tetrafluoride supported on an inert carrier at a temperature in the range from 100° F. to 500° F. and at a rate of flow equivalent to from 1 to 10 volumes of liquid olefin per volume of catalyst per hour.

ALVIN H. FRIEDMAN.

REFERENCES CITED

The following references are of record in the file of this patent:

UNITED STATES PATENTS

| Number | Name | Date |
|---|---|---|
| 1,989,425 | Otto et al. | Jan. 29, 1935 |

OTHER REFERENCES

De Saint-Aunay, Chimie et Industrie 1933, vol. 29, page 1011, absts. in British Chem. Absts. 1933—A694.